(12) United States Patent
Jiang et al.

(10) Patent No.: US 11,973,615 B2
(45) Date of Patent: Apr. 30, 2024

(54) METHOD AND APPARATUS FOR ESTABLISHING COMMUNICATION BETWEEN VEHICLE DIAGNOSIS DEVICE AND VEHICLE, AND VEHICLE COMMUNICATION INTERFACE DEVICE

(71) Applicant: AUTEL INTELLIGENT TECHNOLOGY CORP., LTD., Guangdong (CN)

(72) Inventors: Chu Jiang, Guangdong (CN); Songsong Qu, Guangdong (CN)

(73) Assignee: AUTEL INTELLIGENT TECHNOLOGY CORP., LTD., Guangdong (CN)

( * ) Notice: Subject to any disclaimer, the term of this patent is extended or adjusted under 35 U.S.C. 154(b) by 632 days.

(21) Appl. No.: 17/127,134

(22) Filed: Dec. 18, 2020

(65) Prior Publication Data

US 2021/0111921 A1 Apr. 15, 2021

Related U.S. Application Data

(63) Continuation of application No. PCT/CN2020/116253, filed on Sep. 18, 2020.

(30) Foreign Application Priority Data

Sep. 20, 2019 (CN) .......................... 201910893693.4

(51) Int. Cl.
*H04L 12/40* (2006.01)
*G01M 17/00* (2006.01)
(Continued)

(52) U.S. Cl.
CPC ........ *H04L 12/40013* (2013.01); *G07C 5/008* (2013.01); *G07C 5/0808* (2013.01);
(Continued)

(58) Field of Classification Search
CPC ..... H04L 12/40013; H04L 2012/40208; H04L 2012/40215; H04L 2012/40273;
(Continued)

(56) References Cited

U.S. PATENT DOCUMENTS 9,002,572 B2   4/2015 Lipscomb et al.
2014/0229061 A1   8/2014 Tarnutzer et al.
(Continued)

FOREIGN PATENT DOCUMENTS

CN   101458165 A   6/2009
CN   103293008 A   9/2013
(Continued)

OTHER PUBLICATIONS

The Extended European search report dated Jul. 30, 2021; Appln. No. 20823716.4.

(Continued)

*Primary Examiner* — Kent Krueger (57) ABSTRACT

Embodiments of the present invention relate to the field of vehicle technologies, and disclose a method for establishing communication between a vehicle diagnosis device and a vehicle. The method is applied to a vehicle communication interface device. In the method, when a channel establishment instruction of the vehicle diagnosis device is received, a CAN controller in an idle state in at least two CAN controllers is determined, and then a communication parameter is set for the CAN controller in an idle state. Further, when a specified communication pin set of the vehicle diagnosis device is received, it is determined whether a CAN controller connected to the specified communication pin set is in an idle state. If yes, a communication channel from the vehicle diagnosis device to the specified pin set is established according to a communication parameter in the CAN controller connected to the specified communication pin set, (Continued)

so that the vehicle diagnosis device is communicatively connected to the vehicle through the specified pin set. In the method, no switch is required between the CAN controller and the communication pin set, so that the CAN controller can be easily and quickly allocated.

13 Claims, 4 Drawing Sheets (51) Int. Cl.
  *G07C 5/00* (2006.01)
  *G07C 5/08* (2006.01)
(52) U.S. Cl.
  CPC .... *H04L 12/40019* (2013.01); *G07C 2205/02* (2013.01); *H04L 2012/40215* (2013.01); *H04L 2012/40273* (2013.01)
(58) Field of Classification Search
  CPC .. G07C 5/008; G07C 5/0808; G07C 2205/02; G01M 17/00
  See application file for complete search history.

(56) References Cited

U.S. PATENT DOCUMENTS

| | | |
|---|---|---|
| 2017/0053464 A1 | 2/2017 | Woerz et al. |
| 2017/0084088 A1 | 3/2017 | Reichardt et al. |
| 2018/0225249 A1* | 8/2018 | Lambourne ......... G06F 13/4022 |
| 2018/0225891 A1* | 8/2018 | Lambourne ........ H01R 13/6397 |
| 2019/0173912 A1 | 6/2019 | Ujiie et al. |
| 2021/0184890 A1* | 6/2021 | Kim .................. H04L 12/40039 |

FOREIGN PATENT DOCUMENTS

| | | | | |
|---|---|---|---|---|
| CN | 103616886 A | | 3/2014 | |
| CN | 106936678 A | | 7/2017 | |
| CN | 106970609 | * | 7/2017 | ............. G05B 23/02 |
| CN | 106970609 A | | 7/2017 | |
| CN | 207926623 U | | 9/2018 | |
| CN | 207926624 U | | 9/2018 | |
| CN | 109525473 A | | 3/2019 | |
| CN | 109656172 A | | 4/2019 | |
| CN | 110519144 A | | 11/2019 | |
| JP | 2013104347 A | | 5/2013 | |
| WO | 2015132017 A1 | | 9/2015 | |

OTHER PUBLICATIONS

International Search Report dated Dec. 9, 2020; PCT/CN2020/116253.
First Chinese Office Action dated Feb. 3, 2021; Appln. No. 201910893693.4.

* cited by examiner

METHOD AND APPARATUS FOR ESTABLISHING COMMUNICATION BETWEEN VEHICLE DIAGNOSIS DEVICE AND VEHICLE, AND VEHICLE COMMUNICATION INTERFACE DEVICE

This application is a continuation of International Patent Application No. PCT/CN2020/116253 filed on Sep. 18, 2020, which claims priority to Chinese Patent Application No. 201910893693.4 filed on Sep. 20, 2019, both of which are incorporated by reference herein in their entireties.

BACKGROUND

Technical Field

The present application relates to the field of vehicle technologies, and in particular, to a method and an apparatus for establishing communication between a vehicle diagnosis device and a vehicle, and a vehicle communication interface device.

Related Art

With the development of vehicle technologies, Controller Area Network (CAN) buses are used increasingly widely in vehicles. Currently, some vehicles on the market use three sets of CAN buses for communication, and in the future, four or even more sets of CAN buses may be used simultaneously for communication. This undoubtedly increases the complexity of establishing a communication channel between a vehicle diagnosis device and a vehicle.

When the diagnosis device diagnoses a vehicle, a CAN controller usually needs to be allocated in a process of establishing a channel connection. At this point, it is possible that a communication pin set to be used for communication with a diagnosis interface of the vehicle cannot be determined yet. Therefore, during design of hardware of the diagnosis device, it needs to be ensured that each CAN controller can be freely connected to each set of communication pins.

In an existing implementation method, the free connection between the communication pin and the CAN controller is implemented by using a switch (relay). In this solution, for example, to allow four CAN controllers to freely switch to four sets of CAN communication pins, 12 switches are required. Obviously, in this solution, when there are a relatively large quantity of CAN controllers and communication pins, a relatively large quantity of switches are required for allocating the CAN controllers, resulting in relatively complex line connections.

SUMMARY

With regard to the foregoing defects in the related art, an objective of embodiments of the present invention is to provide a method and an apparatus for establishing communication between a vehicle diagnosis device and a vehicle, and a diagnosis device, to easily and quickly allocate a CAN controller.

The objective of the embodiments of the present invention is achieved by using the following technical solutions:

To resolve the foregoing technical problem, according to a first aspect, an embodiment of the present invention provides a method for establishing communication between a vehicle diagnosis device and a vehicle, applied to a vehicle communication interface (VCI) device, the vehicle communication interface device being configured to connect the vehicle diagnosis device and the vehicle, the vehicle communication interface device including at least two CAN controllers, at least two CAN transceivers and a diagnosis interface, the diagnosis interface including at least two communication pin sets, each CAN transceiver being connected to one CAN controller and one communication pin set, the method including:
  determining each CAN controller in an idle state in the at least two CAN controllers when a channel establishment instruction of the vehicle diagnosis device is received;
  setting a communication parameter for the CAN controller in an idle state;
  determining, when a specified communication pin set of the vehicle diagnosis device is received, whether a CAN controller connected to the specified communication pin set is in an idle state; and
  establishing, if the CAN controller connected to the specified communication pin set is in an idle state, a communication channel from the vehicle diagnosis device to the specified pin set according to a communication parameter in the CAN controller connected to the specified communication pin set, so that the vehicle diagnosis device is communicatively connected to the vehicle through the specified pin set.

In some embodiments, before the step of receiving a channel establishment instruction of the vehicle diagnosis device, the method further includes:
  determining whether the vehicle diagnosis device has delivered the channel establishment instruction; and
  initializing the CAN controller in an idle state if the vehicle diagnosis device has delivered the channel establishment instruction.

In some embodiments, before the step of receiving a specified communication pin set of the vehicle diagnosis device, the method further includes:
  receiving a specifying instruction delivered by the vehicle diagnosis device, the specifying instruction carrying an identifier of the specified communication pin set; and
  traversing the communication pin sets in the diagnosis interface according to the identifier, to obtain the specified communication pin set matching the identifier.

In some embodiments, before the step of setting a communication parameter for the CAN controller in an idle state, the method further includes:
  determining whether the vehicle diagnosis device has delivered the communication parameter of the CAN controller; and
  obtaining the communication parameter if the vehicle diagnosis device has delivered the communication parameter of the CAN controller; or
  performing the step of receiving a specifying instruction delivered by the vehicle diagnosis device if the vehicle diagnosis device has not delivered the communication parameter of the CAN controller.

In some embodiments, the method further includes:
  adjusting the CAN controller on the established communication channel to an occupied state.

In some embodiments, the method further includes:
  resetting each remaining CAN controller in an idle state.

In some embodiments, the vehicle communication interface device further includes at least two switches, disposed between the CAN transceivers and the diagnosis interface, and the method further includes:
  determining whether the CAN controller is in an occupied state; and controlling the switch to turn on if the CAN controller is in an occupied state; or controlling the switch to turn off if the CAN controller is not in an occupied state.

In some embodiments, the communication parameter includes a baud rate and/or a filter.

To resolve the foregoing technical problem, according to a second aspect, an embodiment of the present invention provides an apparatus for establishing communication between a vehicle diagnosis device and a vehicle, applied to a vehicle communication interface (VCI) device, the vehicle communication interface device being configured to connect the vehicle diagnosis device and the vehicle, the vehicle communication interface device including at least two CAN controllers, at least two CAN transceivers and a diagnosis interface, the diagnosis interface including at least two communication pin sets, each CAN transceiver being connected to one CAN controller and one communication pin set, the apparatus including:

a first determining module, configured to determine each CAN controller in an idle state in the at least two CAN controllers when a channel establishment instruction of the vehicle diagnosis device is received;

a parameter setting module, configured to set a communication parameter for the CAN controller in an idle state;

a second determining module, configured to determine, when a specified communication pin set of the vehicle diagnosis device is received, whether a CAN controller connected to the specified communication pin set is in an idle state; and a channel establishment module, configured to establish, when the CAN controller connected to the specified communication pin set is in an idle state, a communication channel from the vehicle diagnosis device to the specified pin set according to a communication parameter in the CAN controller connected to the specified communication pin set, so that the vehicle diagnosis device is communicatively connected to the vehicle through the specified pin set.

In some embodiments, the apparatus further includes:

a third determining module, configured to determine whether the vehicle diagnosis device has delivered the channel establishment instruction; and an initialization module, configured to initialize the CAN controller in an idle state when it is determined that the vehicle diagnosis device has delivered the channel establishment instruction.

In some embodiments, the apparatus further includes:

a receiving module, configured to receive a specifying instruction delivered by the vehicle diagnosis device, the specifying instruction carrying an identifier of the specified communication pin set; and a first obtaining module, configured to traverse the communication pin sets in the diagnosis interface according to the identifier, to obtain the specified communication pin set matching the identifier.

In some embodiments, the apparatus further includes:

a fourth determining module, configured to determine whether the vehicle diagnosis device has delivered the communication parameter of the CAN controller; and a second obtaining module, configured to obtain the communication parameter when it is determined that the vehicle diagnosis device has delivered the communication parameter of the CAN controller;

the receiving module being further configured to receive the specifying instruction delivered by the vehicle diagnosis device when it is determined that the vehicle diagnosis device has not delivered the communication parameter of the CAN controller.

In some embodiments, the apparatus further includes:

an adjustment module, configured to adjust the CAN controller on the established communication channel to an occupied state.

In some embodiments, the apparatus further includes:

a reset module, configured to reset each remaining CAN controller in an idle state.

In some embodiments, the vehicle communication interface device further includes at least two switches, disposed between the CAN transceivers and the diagnosis interface, and the apparatus further includes:

a fifth determining module, configured to determine whether the CAN controller is in an occupied state; and a control module, configured to control the switch to turn on when it is determined that the CAN controller is in an occupied state;

the control module being further configured to control the switch to turn off when it is determined that the CAN controller is not in an occupied state.

In some embodiments, the communication parameter includes a baud rate and/or a filter.

To resolve the foregoing technical problem, according to a third aspect, an embodiment of the present invention provides a vehicle communication interface device, including:

at least one processor; and a memory in communication connection with the at least one processor, where the memory stores instructions executable by the at least one processor, the instructions being executed by the at least one processor, to cause the at least one processor to perform the method according to the first aspect.

To resolve the foregoing technical problem, according to a fourth aspect, an embodiment of the present invention further provides a computer-readable storage medium, storing computer-executable instructions, the computer-executable instruction being used to cause a computer to perform the method according to the first aspect.

To resolve the foregoing technical problem, according to a fifth aspect, an embodiment of the present invention further provides a computer program product, including a computer program stored in a computer-readable storage medium, the computer program including program instructions, the program instructions, when executed by a computer, causing the computer to perform the method according to the first aspect.

Compared with the related art, the present invention has the following beneficial effects: In the embodiments of the present invention, a method for establishing communication between a vehicle diagnosis device and a vehicle is provided. The method is applied to a vehicle communication interface device. The vehicle communication interface device includes at least two CAN controllers, at least two CAN transceivers and a diagnosis interface. One CAN transceiver is separately connected to one CAN controller and one communication pin set of the diagnosis interface. In the method, when the channel establishment instruction of the vehicle diagnosis device is received, each CAN controller in an idle state in the at least two CAN controllers is determined, and then the communication parameter is set for the CAN controller in an idle state. Further, when the specified communication pin set of the vehicle diagnosis device is received, it is determined whether the CAN controller connected to the specified communication pin set is in an idle state. If yes, the communication channel from the vehicle diagnosis device to the specified pin set is established according to the communication parameter in the CAN controller connected to the specified communication pin set, so that the vehicle diagnosis device is communicatively connected to the vehicle through the specified pin set. In the method, no switch is required between the CAN controller and the communication pin set, so that the CAN controller can be easily and quickly allocated.

BRIEF DESCRIPTION OF THE DRAWINGS

One or more embodiments are described by way of example with reference to the corresponding figures in the accompanying drawings, and the exemplary descriptions are not to be construed as limiting the embodiments. Elements/modules and steps in the accompanying drawings that have same reference numerals are represented as similar elements/modules and steps, and unless otherwise particularly stated, the figures in the accompanying drawings are not drawn to scale.

DETAILED DESCRIPTION

The present invention is described in detail below with reference to specific embodiments. The following embodiments will help a person skilled in the art to further understand the present invention, but are not intended to limit the present invention in any form. It should be noted that, a person of ordinary skill in the art may further make some variations and improvements without departing from the concept of the present invention. The variations and improvements shall fall within the protection scope of the present invention.

To make the objectives, technical solutions and advantages of the present application clearer and more comprehensible, the present application is further described in detail below with reference to the accompanying drawings and the embodiments. It is to be understood that the specific embodiments described herein are merely used to describe the present application, instead of limiting the present application.

It should be noted that, if no conflict occurs, features in the embodiments of the present invention may be combined with each other and fall within the protection scope of the present application. In addition, although functional module division is performed in the schematic diagram of the apparatus, and a logical sequence is shown in the flowchart, in some cases, the shown or described steps may be performed by using module division different from the module division in the apparatus, or in a sequence different from the sequence in the flowchart. In addition, words such as "first", "second" and "third" used in this specification do not limit data or an execution order, but are only used to distinguish same objects or similar objects whose functions and purposes are basically the same.

Unless otherwise defined, meanings of all technical and scientific terms used in this specification are the same as that usually understood by a person skilled in the technical field to which the present invention belongs. Terms used in the specification of the present invention are merely intended to describe objectives of the specific implementations, and are not intended to limit the present invention. The term "and/or" used in the specification includes any and all combinations of one or more related listed items.

In addition, technical features involved in implementations of the present invention that are described below may be combined with each other as long as no conflict occurs.

Figure 1:
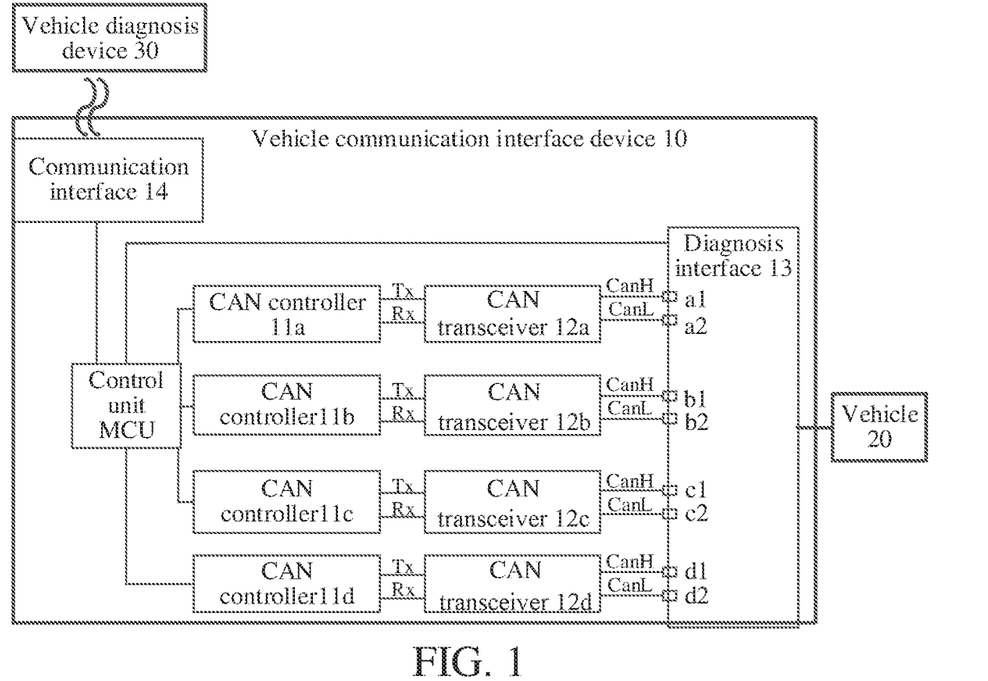
FIG. 1 is a schematic structural diagram of an exemplary system of an embodiment of a method for establishing communication between a vehicle diagnosis device and a vehicle according to an embodiment of the present invention.

FIG. 1 is a schematic structural diagram of an exemplary system applied to an embodiment of a method for establishing communication between a vehicle diagnosis device and a vehicle according to the present invention. As shown in FIG. 1, the system structure includes a vehicle communication interface (VCI) device 10, a vehicle 20 and a vehicle diagnosis device 30. The vehicle communication interface device 10 is electrically connected to the vehicle 20. Specifically, in this embodiment of the present invention, the vehicle communication interface device 10 is electrically connected to a vehicle diagnosis interface of the vehicle 20 through a diagnosis interface 13 of the vehicle communication interface device 10. The vehicle communication interface device 10 is in communication connection with the vehicle diagnosis device 30. The communication connection may be a network connection, and may include various connection types, for example, wired or wireless communication, or a fiber optic cable.

The vehicle communication interface device 10 includes a control unit MCU, at least two CAN controllers 11, at least two CAN transceivers 12, the diagnosis interface 13 and a communication interface 14. The diagnosis interface 13 includes at least two communication pin sets. Each CAN transceiver 12 is connected to one CAN controller 11 and one communication pin set. The control unit MCU is connected to the at least two CAN controllers 11, the diagnosis interface 13 and the communication interface 14. The control unit MCU can exchange data with the CAN controllers 11 and the diagnosis interface 13, obtain detection data of the vehicle 20 by using the CAN controllers 11, upload diagnosis data to the vehicle diagnosis device 30 by using the communication interface 14, and obtain and perform an instruction delivered by the vehicle diagnosis device 30 by using the communication interface 14. The vehicle communication interface device 10 is an integrated detection-and-testing mechanical device configured to find a technical status of the vehicle 20 and obtain a reliable conclusion, including but not limited to detecting lights, braking, side-slip, an engine, points, exhaust and/or noise of the vehicle 20.

It should be noted that, the method for establishing communication between a vehicle diagnosis device and a vehicle provided in this embodiment of the present invention is usually performed by the control unit MCU in the vehicle communication interface device 10. Correspondingly, an apparatus for establishing communication between a vehicle diagnosis device and a vehicle is usually implemented by the control unit MCU in the vehicle communication interface device 10.

In this embodiment of the present invention, as shown in FIG. 1, the vehicle communication interface device 10 includes four CAN controllers: a CAN controller 11a, a CAN controller 11b, a CAN controller 11c and a CAN controller 11d. The vehicle communication interface device 10 includes four CAN transceivers: a CAN transceiver 12a, a CAN transceiver 12b, a CAN transceiver 12c and a CAN transceiver 12d. The diagnosis interface includes four communication pin sets: communication pins a1 and a2, communication pins b1 and b2, communication pins c1 and c2, and communication pins d1 and d2.

Each CAN transceiver is correspondingly connected to one CAN controller through a transceiving fiber. The transceiving fiber includes a transmitting fiber Tx and a receiving fiber Rx. Each CAN transceiver is correspondingly connected to one communication pin set through a CAN bus. Specifically, the CAN transceiver 12a is connected to the CAN controller 11a and the communication pins a1 and a2. The CAN transceiver 12b is connected to the CAN controller 11b and the communication pins b1 and b2. The CAN transceiver 12c is connected to the CAN controller 11c and the communication pins c1 and c2. The CAN transceiver 12d is connected to the CAN controller 11d and the communication pins d1 and d2.

In the vehicle communication interface device 10 provided in this embodiment of the present invention, each CAN controller is correspondingly connected to only one set of communication pins. Through the following method for establishing communication between a vehicle diagnosis device and a vehicle, it is ensured that each communication pin can be correctly allocated with a corresponding CAN controller without connecting each CAN controller to each set of communication pins by using switches of the same quantity as the communication pin sets. Therefore, the vehicle communication interface device 10 provided in this embodiment of the present invention can greatly reduce the area of a circuit board, reduce use and material costs of electronic components, and reduce power consumption/heat of the diagnosis device. In addition, the vehicle communication interface device 10 can further shorten a connection establishing time of a physical line, thereby improving the signal quality.

Specifically, when receiving a channel establishment instruction of the vehicle diagnosis device, the control unit MCU in the vehicle communication interface device 10 determines each CAN controller in an idle state in the at least two CAN controllers, and then sets a communication parameter for the CAN controller in an idle state. Further, when receiving a specified communication pin set of the vehicle diagnosis device, the control unit MCU in the vehicle communication interface device 10 determines whether a CAN controller connected to the specified communication pin set is in an idle state, and if yes, establishes a communication channel from the vehicle diagnosis device to the specified pin set according to a communication parameter in the CAN controller connected to the specified communication pin set, so that the vehicle diagnosis device is communicatively connected to the vehicle through the specified pin set.

In some embodiments, the diagnosis device may further include at least two switches, disposed between the CAN transceivers and the diagnosis interface. The switch is disconnected in a case that a CAN controller on a line on which the switch is located is not working, that is, the CAN controller is not in an occupied state, to disconnect a CAN transceiver on the line on which the switch is located from the diagnosis interface.

The vehicle 20 is a common power-driven automobile. A vehicle diagnosis interface is provided in the vehicle 20, is connected to the diagnosis interface 13 of the vehicle communication interface device 10, and is configured to provide technical statuses and/or test results of detection on apparatuses, devices, modules and systems in the vehicle 20.

The vehicle diagnosis device 30 is an electronic device installed with a diagnosis application and capable of running the diagnosis application. The diagnosis application can deliver a channel establishment instruction and a communication parameter of a CAN controller to the vehicle communication interface device 10. The diagnosis application can further obtain error information and diagnosis data reported by the vehicle communication interface device 10. Therefore, the vehicle diagnosis device 30 is an electronic device capable of being communicatively connected to the vehicle communication interface device 10. For example, the vehicle diagnosis device 30 may be a diagnostic instrument, a mobile terminal, a tablet computer, or the like. Specifically, the vehicle diagnosis device 30 may be selected according to actual requirements without being limited to this embodiment of the present invention.

Specifically, the following further describes the embodiments of the present invention with reference to the accompanying drawings.

Figure 2:
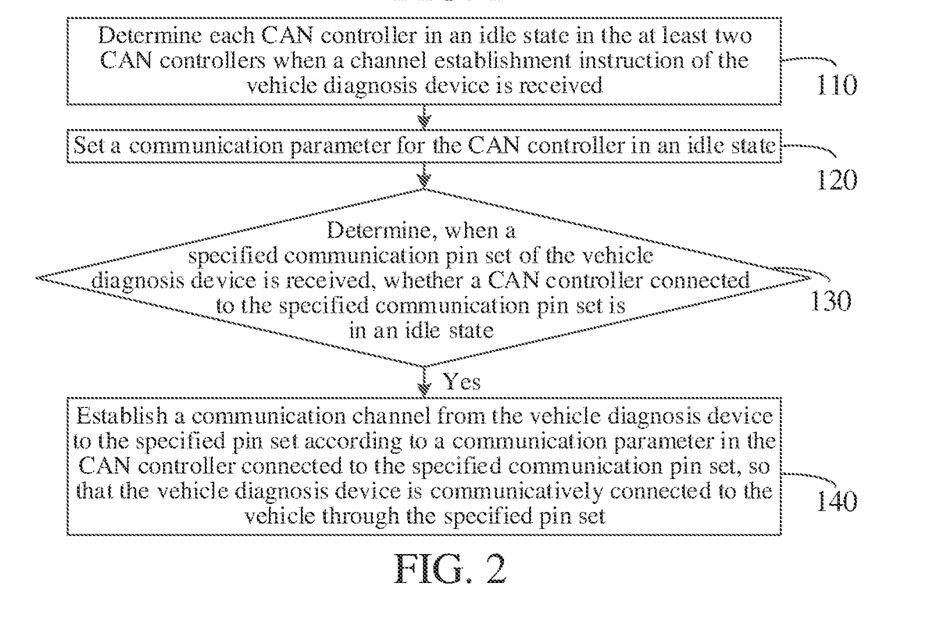
FIG. 2 is a schematic flowchart of a method for establishing communication between a vehicle diagnosis device and a vehicle according to an embodiment of the present invention.

An embodiment of the present invention provides a method for establishing communication between a vehicle diagnosis device and a vehicle. The method may be performed by the foregoing vehicle communication interface device 10 (the control unit MCU thereof). The vehicle communication interface device is configured to connect the vehicle diagnosis device and the vehicle. The vehicle communication interface device includes at least two CAN controllers, at least two CAN transceivers and a diagnosis interface. The diagnosis interface includes at least two communication pin sets. Each CAN transceiver is connected to one CAN controller and one communication pin set. FIG. 2 is a flowchart of a method for establishing communication between a vehicle diagnosis device and a vehicle to which the foregoing system architecture is applied. The method includes but is not limited to the following steps:

Step 110: Determine each CAN controller in an idle state in the at least two CAN controllers when a channel establishment instruction of the vehicle diagnosis device is received.

In this embodiment of the present invention, first, when the channel establishment instruction delivered by the vehicle diagnosis device is received, each CAN controller in an idle state in the at least two CAN controllers is determined. The CAN controller in an idle state refers to a CAN controller that is not in communication. Therefore, the CAN controller in an idle state may be configured to establish a new communication channel.

Step 120: Set a communication parameter for the CAN controller in an idle state.

Then, the communication parameter is set for the CAN controller in an idle state, to initially set the communication channel. The communication parameter includes but is not limited to a baud rate and/or a filter. Generally, a CAN controller can work only after a communication parameter is preset. The CAN controller can obtain required data information through screening and exchange data at a preset data transmission rate only after the communication parameter of the CAN controller is preset.

Step 130: Determine, when a specified communication pin set of the vehicle diagnosis device is received, whether a CAN controller connected to the specified communication pin set is in an idle state. If yes, perform step 140; or if not, report error information to the vehicle diagnosis device.

In this embodiment of the present invention, the vehicle diagnosis device actively selects/specifies a communication pin set for connection communication with the vehicle diagnosis interface of the vehicle. Further, when the specified communication pin set of the vehicle diagnosis device is received, it is determined whether the CAN controller connected to the specified communication pin set is in an idle state. In this embodiment of the present invention, only a CAN controller in an idle state can be configured to establish a new communication channel.

In addition, if the CAN controller connected to the specified communication pin set is not in an idle state, there may be two cases. In one case, the CAN controller connected to the specified communication pin set is in a communication state, and there is an established communication channel. In this case, the vehicle diagnosis device is required to determine whether vehicle data currently acquired by the CAN controller is data to be detected by the vehicle diagnosis device. If yes, the communication channel does not need to be established again; or if not, step 110 may be performed again after the CAN controller is reset. In the other case, the CAN controller is not in an idle state due to some reasons, for example, the CAN controller is damaged. In this case, the problem of the CAN controller needs to be diagnosed by the vehicle diagnosis device or the control unit in the vehicle communication interface device. For the two cases that may occur, that is, when the CAN controller connected to the specified communication pin set is not in an idle state, the error information needs to be reported to the vehicle diagnosis device, and the vehicle diagnosis device further performs operations such as detection or diagnosis.

Step 140: Establish a communication channel from the vehicle diagnosis device to the specified pin set according to a communication parameter in the CAN controller connected to the specified communication pin set, so that the vehicle diagnosis device is communicatively connected to the vehicle through the specified pin set.

After it is determined that the CAN controller connected to the specified communication pin set is in an idle state, the communication channel is established according to the communication parameter, so that data information of the vehicle can be transmitted to the CAN controller through the specified communication pin set, and the CAN controller can control a data transmission rate of the communication channel on which the CAN controller is located. Then, according to setting of the communication parameter, the CAN controller screens out detection data required by the vehicle diagnosis device. Further, the control unit MCU uploads the data to the vehicle diagnosis device by using a communication interface.

In this embodiment of the present invention, a method for establishing communication between a vehicle diagnosis device and a vehicle is provided. The method is applied to a vehicle communication interface device. The vehicle communication interface device includes at least two CAN controllers, at least two CAN transceivers and a diagnosis interface.

Each CAN transceiver is connected to one CAN controller and one communication pin set of the diagnosis interface. In the method, when the channel establishment instruction of the vehicle diagnosis device is received, each CAN controller in an idle state in the at least two CAN controllers is determined, and then the communication parameter is set for the CAN controller in an idle state. Further, when the specified communication pin set of the vehicle diagnosis device is received, it is determined whether the CAN controller connected to the specified communication pin set is in an idle state. If yes, the communication channel from the vehicle diagnosis device to the specified pin set is established according to the communication parameter in the CAN controller connected to the specified communication pin set, so that the vehicle diagnosis device is communicatively connected to the vehicle through the specified pin set. In the method, no switch is required between the CAN controller and the communication pin set, so that the CAN controller can be easily and quickly allocated.

Figure 3:
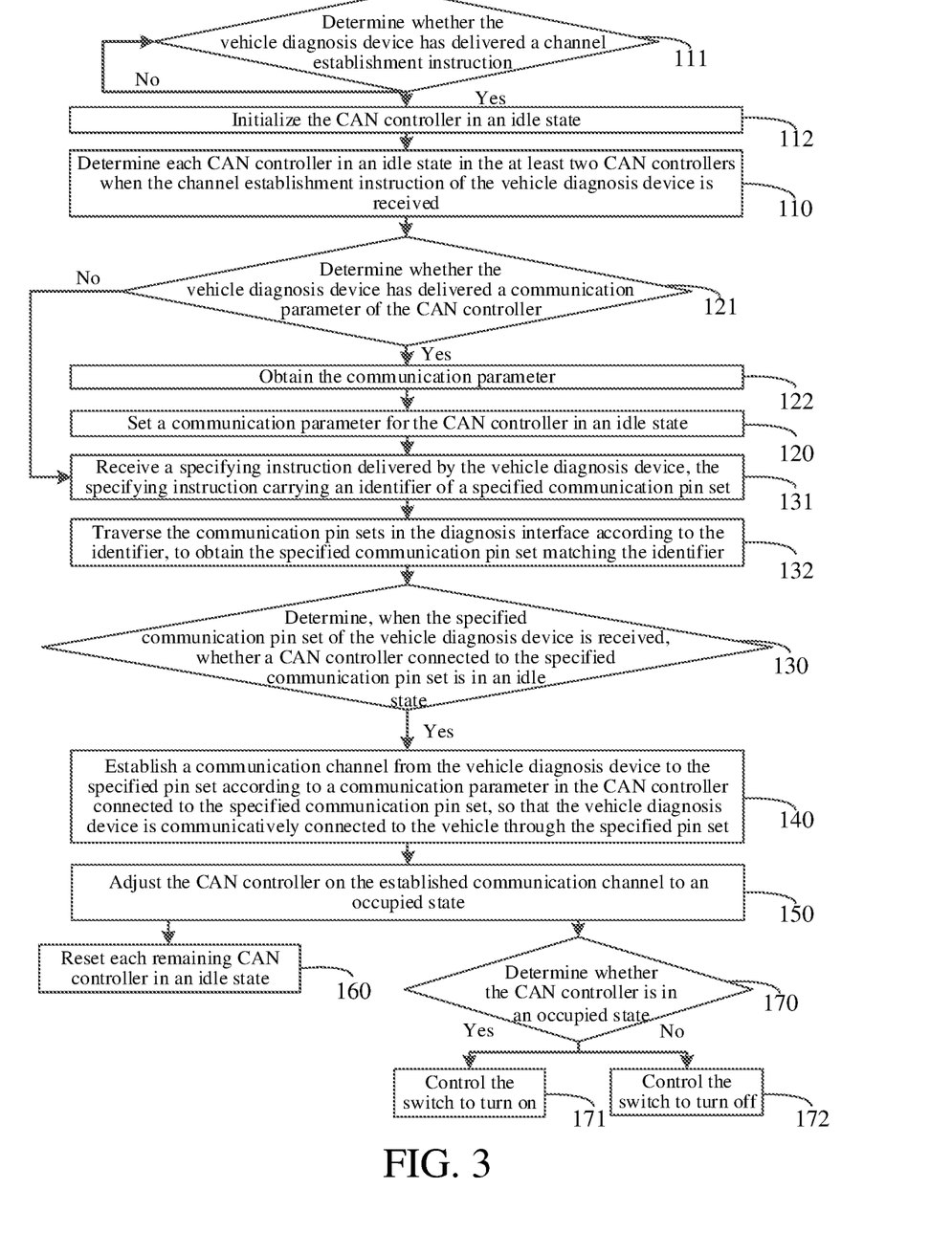
FIG. 3 is a schematic flowchart of another method for establishing communication between a vehicle diagnosis device and a vehicle according to an embodiment of the present invention.

In some embodiments, FIG. 3 is a flowchart of another method for establishing communication between a vehicle diagnosis device and a vehicle according to an embodiment of the present invention. Based on the method for establishing communication between a vehicle diagnosis device and a vehicle shown in FIG. 2, before step 110, the method further includes:

Step 111: Determine whether the vehicle diagnosis device has delivered the channel establishment instruction. If yes, perform step 112; or if not, return to step 111.

Step 112: Initialize the CAN controller in an idle state.

In this embodiment of the present invention, after it is determined that the vehicle diagnosis device has delivered the channel establishment instruction and before the communication parameter used for the CAN controller and the specified communication pin set used for communication are obtained, it is further required to determine whether the diagnosis application has delivered the channel establishment instruction. When the diagnosis application has delivered the channel establishment instruction, the CAN controller in an idle state is initialized. The initialization refers to starting the CAN controller. That is, a CAN controller in a non-communication state is started, to preliminarily allocate software resources of the CAN controller, so that the CAN controller enters a ready-to-work state.

In some embodiments, still referring to FIG. 3, before step 130, the method further includes:

Step 131: Receive a specifying instruction delivered by the vehicle diagnosis device, the specifying instruction carrying an identifier of the specified communication pin set.

Step 132: Traverse the communication pin sets in the diagnosis interface according to the identifier, to obtain the specified communication pin set matching the identifier.

Before obtaining the communication pin set for communication, the vehicle communication interface device obtains the specifying instruction delivered by the vehicle diagnosis device for the communication pin set. The specifying instruction carries the identifier of the specified communication pin set. The identifier is a unique identifier of each communication pin set, for example, a number of each communication pin set. Then, all the communication pin sets in the diagnosis interface are traversed according to the identifier, to obtain the communication pin set matching the identifier. For example, numbers of all the communication pin sets in the diagnosis interface are traversed, to obtain a communication pin set whose number is the same as the identifier, so that the communication pin set for communication may be obtained.

In some embodiments, still referring to FIG. 3, before step 120, the method further includes:

Step 121: Determine whether the vehicle diagnosis device has delivered the communication parameter of the CAN controller. If yes, perform step 122; or if not, perform step 131.

Step 122: Obtain the communication parameter.

The communication parameter includes a baud rate and/or a filter. In this embodiment of the present invention, some CAN controllers can work only after the communication parameters are preset. Therefore, after the CAN controller in an idle state is initialized, it is further required to determine whether the vehicle diagnosis device has delivered the communication parameter of the CAN controller. If the communication parameter of the CAN controller has been delivered, the communication parameter is obtained. Further, the communication parameter is sent to the CAN controller in an idle state, to preset the CAN controller. For example, when information from some data sources needs to be eliminated, a mask and/or a verification code of a filter may be preset, so that the CAN controller can filter out such information that needs to be eliminated. In some other embodiments, there may be a CAN controller that is not required to be preset. In this case, the vehicle diagnosis device does not deliver the communication parameter, but directly delivers the specified communication pin set used for communication.

In some embodiments, still referring to FIG. 3, the method further includes:

Step 150: Adjust the CAN controller on the established communication channel to an occupied state.

Step 160: Reset each remaining CAN controller in an idle state.

In this embodiment of the present invention, the CAN controller on the established communication channel needs to be adjusted to an occupied state, to avoid that when a new communication channel needs to be established, the CAN controller on the established communication channel is used as a CAN controller in an idle state to establish the new communication channel. After the CAN controller on the established communication channel is adjusted to an occupied state, further, other CAN controllers in an idle state are reset, that is, each CAN controller in an idle state determined in step 110 except the CAN controller on the established communication channel is turned off, to release software resources. The reset CAN controller waits to be initialized after the vehicle diagnosis device delivers a channel establishment instruction again.

In some embodiments, the vehicle communication interface device further includes at least two switches, disposed between the CAN transceivers and the diagnosis interface. Still referring to FIG. 3, the method further includes:

Step 170: Determine whether the CAN controller is in an occupied state. If yes, perform step 171; or if not, perform step 172.

Step 171: Control the switch to turn on.

Step 172: Control the switch to turn off.

In this embodiment of the present invention, the switch may be further disposed between the CAN transceivers and the diagnosis interface. When the CAN controller is not used, the switch is turned off to cut off a connection between the CAN transceiver and the diagnosis interface. Specifically, it may be determined whether the CAN controller is in an occupied state. When the CAN controller is in an occupied state, it indicates that the CAN controller is currently in a communication state and the communication channel has been established, and in this case, the switch on the same line as the CAN controller is controlled to turn on. When the CAN controller is not in an occupied state, it indicates that the CAN controller is currently not in a communication state and no communication channel has been established, and in this case, the switch on the same line as the CAN controller is controlled to be disconnected or to turn off.

Figure 4:
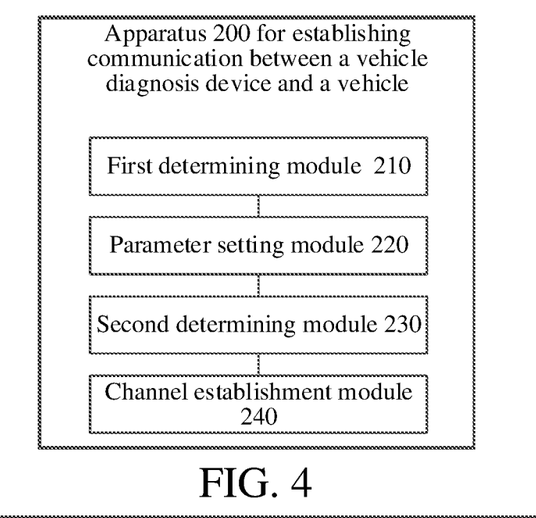
FIG. 4 is a schematic structural diagram of an apparatus for establishing communication between a vehicle diagnosis device and a vehicle according to an embodiment of the present invention.

An embodiment of the present invention further provides an apparatus for establishing communication between a vehicle diagnosis device and a vehicle, applied to a vehicle communication interface (VCI) device, the vehicle communication interface device being configured to connect the vehicle diagnosis device and the vehicle, the vehicle communication interface device including at least two CAN controllers, at least two CAN transceivers and a diagnosis interface, the diagnosis interface including at least two communication pin sets, each CAN transceiver being connected to one CAN controller and one communication pin set. FIG. 4 shows a structure of an apparatus for establishing communication between a vehicle diagnosis device and a vehicle according to an embodiment of the present application. The apparatus 200 for establishing communication between a vehicle diagnosis device and a vehicle includes a first determining module 210, a parameter setting module 220, a second determining module 230 and a channel establishment module 240.

The first determining module 210 is configured to determine each CAN controller in an idle state in the at least two CAN controllers when a channel establishment instruction of the vehicle diagnosis device is received.

The parameter setting module 220 is configured to set a communication parameter for the CAN controller in an idle state.

The second determining module 230 is configured to determine, when a specified communication pin set of the vehicle diagnosis device is received, whether a CAN controller connected to the specified communication pin set is in an idle state.

The channel establishment module 240 is configured to establish, when the CAN controller connected to the specified communication pin set is in an idle state, a communication channel from the vehicle diagnosis device to the specified pin set according to a communication parameter in the CAN controller connected to the specified communication pin set, so that the vehicle diagnosis device is communicatively connected to the vehicle through the specified pin set.

Figure 5:
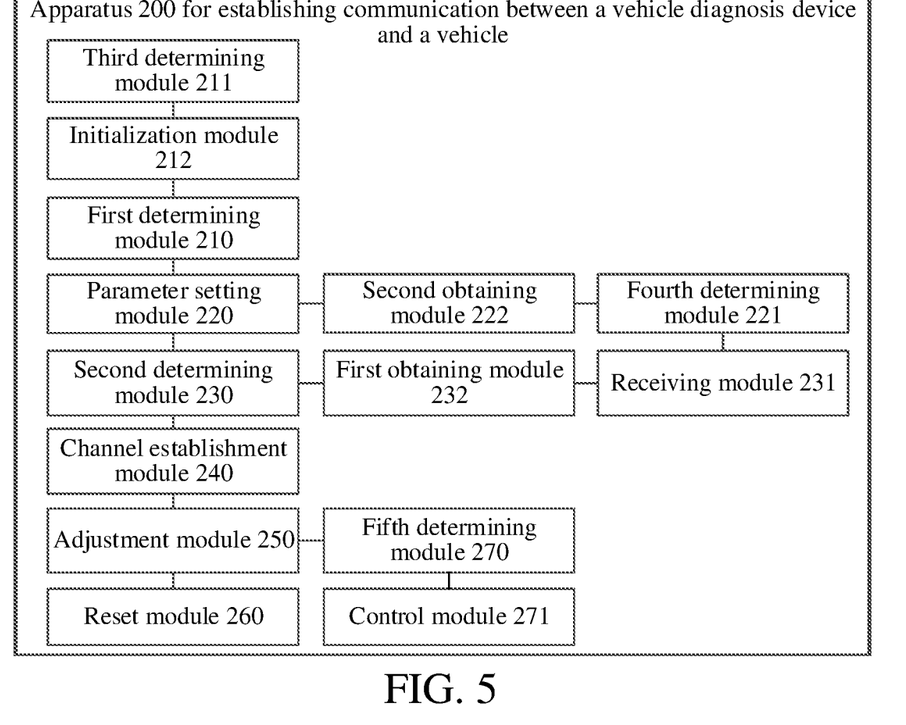
FIG. 5 is a schematic structural diagram of another apparatus for establishing communication between a vehicle diagnosis device and a vehicle according to an embodiment of the present invention.

In some embodiments, FIG. 5 shows a structure of another apparatus for establishing communication between a vehicle diagnosis device and a vehicle according to an embodiment of the present application. The apparatus 200 for establishing communication between a vehicle diagnosis device and a vehicle further includes a third determining module 211 and an initialization module 212.

The third determining module 211 is configured to determine whether the vehicle diagnosis device has delivered the channel establishment instruction.

The initialization module 212 is configured to initialize the CAN controller in an idle state when it is determined that the vehicle diagnosis device has delivered the channel establishment instruction.

In some embodiments, still referring to FIG. 5, the apparatus 200 for establishing communication between a vehicle diagnosis device and a vehicle further includes a receiving module 231 and a first obtaining module 232.

The receiving module 231 is configured to receive a specifying instruction delivered by the vehicle diagnosis device, the specifying instruction carrying an identifier of the specified communication pin set.

The first obtaining module 232 is configured to traverse the communication pin sets in the diagnosis interface according to the identifier, to obtain the specified communication pin set matching the identifier.

In some embodiments, still referring to FIG. 5, the apparatus 200 for establishing communication between a vehicle diagnosis device and a vehicle further includes a fourth determining module 221 and a second obtaining module 222.

The fourth determining module 221 is configured to determine whether the vehicle diagnosis device has delivered the communication parameter of the CAN controller.

The second obtaining module 222 is configured to obtain the communication parameter when it is determined that the vehicle diagnosis device has delivered the communication parameter of the CAN controller.

The receiving module 231 is further configured to receive the specifying instruction delivered by the vehicle diagnosis device when it is determined that the vehicle diagnosis device has not delivered the communication parameter of the CAN controller.

In some embodiments, still referring to FIG. 5, the apparatus 200 for establishing communication between a vehicle diagnosis device and a vehicle further includes an adjustment module 250.

The adjustment module 250 is configured to adjust the CAN controller on the established communication channel to an occupied state.

In some embodiments, still referring to FIG. 5, the apparatus 200 for establishing communication between a vehicle diagnosis device and a vehicle further includes a reset module 260.

The reset module 260 is configured to reset each remaining CAN controller in an idle state.

In some embodiments, the vehicle communication interface device further includes at least two switches, disposed between the CAN transceivers and the diagnosis interface. Still referring to FIG. 5, the apparatus 200 for establishing communication between a vehicle diagnosis device and a vehicle further includes a fifth determining module 270 and a control module 271.

The fifth determining module 270 is configured to determine whether the CAN controller is in an occupied state.

The control module 271 is configured to control the switch to turn on when it is determined that the CAN controller is in an occupied state.

The control module 271 is further configured to control the switch to turn off when it is determined that the CAN controller is not in an occupied state.

In some embodiments, the communication parameter includes a baud rate and/or a filter.

In this embodiment of the present invention, an apparatus for establishing communication between a vehicle diagnosis device and a vehicle is provided. The apparatus is applied to a vehicle communication interface device. The vehicle communication interface device includes at least two CAN controllers, at least two CAN transceivers and a diagnosis interface. Each CAN transceiver is separately connected to one CAN controller and one communication pin set of the diagnosis interface. The apparatus determines, by using the first determining module 210, each CAN controller in an idle state in the at least two CAN controllers when the channel establishment instruction of the vehicle diagnosis device is received, and then sets the communication parameter for the CAN controller in an idle state by using the parameter setting module 220. Further, the apparatus determines, by using the second determining module 230, whether the CAN controller connected to the specified communication pin set is in an idle state, and if yes, the apparatus establishes, by using the channel establishment module 240, the communication channel from the vehicle diagnosis device to the specified pin set according to the communication parameter in the CAN controller connected to the specified communication pin set, so that the vehicle diagnosis device is communicatively connected to the vehicle through the specified pin set. In the method, no switch is required between the CAN controller and the communication pin set, so that the CAN controller can be easily and quickly allocated.

Figure 6:
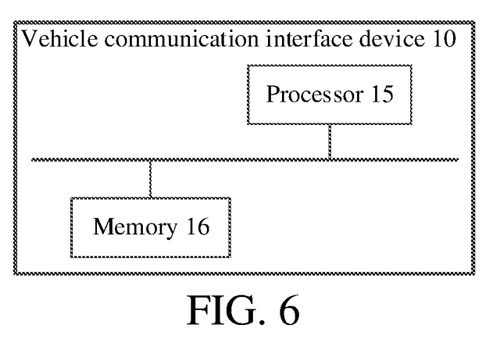
FIG. 6 is a schematic diagram of a hardware structure of a diagnosis device according to an embodiment of the present invention.

An embodiment of the present invention further provides a diagnosis device. FIG. 6 shows a hardware structure of a diagnosis device that can perform the method for establishing communication between a vehicle diagnosis device and a vehicle in FIG. 2 to FIG. 4. The vehicle communication interface device 10 may be the vehicle communication interface device 10 shown in FIG. 1.

The vehicle communication interface device 10 includes at least one processor 15 and a memory 16 in communication connection with the at least one processor 15. In FIG. 6, for example, there is one processor 15. The memory 16 stores instructions executable by the at least one processor 15. The instructions are executed by the at least one processor 15, to cause the at least one processor 15 to perform the method for establishing communication between a vehicle diagnosis device and a vehicle in FIG. 2 to FIG. 4. The processor 15 and the memory 16 may be connected through a bus or in other manners. In FIG. 6, for example, the processor and the memory are connected through a bus.

The memory 16, as a non-volatile computer-readable storage medium, may be configured to store a non-volatile software program, a non-volatile computer-executable program and a module, for example, program instructions/modules corresponding to the method for establishing communication between a vehicle diagnosis device and a vehicle in the embodiments of the present application, for example, the modules shown in FIG. 4 and FIG. 5. The processor 15 runs the non-volatile software program, instructions and module stored in the memory 16, to implement various functional applications and data processing of a server, that is, to implement the method for establishing communication between a vehicle diagnosis device and a vehicle described in the foregoing method embodiments.

The memory 16 may include a program storage area and a data storage area. The program storage area may store an operating system and an application program required by at least one function. The data storage area may store data created according to use of the apparatus for establishing communication between a vehicle diagnosis device and a vehicle, and the like. In addition, the memory 16 may include a high speed random access memory, and may also include a non-volatile memory such as at least one magnetic disk storage device, a flash memory, or another non-volatile solid-state storage device. In some embodiments, the memory 16 optionally includes memories remotely disposed relative to the processor 15. These remote memories may be connected, through a network, to the apparatus for establishing communication between a vehicle diagnosis device and a vehicle. An example of the network includes, but is not limited to, the Internet, an intranet, a local area network, a mobile communication network and a combination thereof.

The one or more modules are stored in the memory 16, and when executed by the one or more processors 15, perform the method for establishing communication between a vehicle diagnosis device and a vehicle in any of the foregoing method embodiments. For example, the method steps in FIG. 2 and FIG. 3 are performed, to implement the functions of the modules and units in FIG. 4 and FIG. 5.

The foregoing product may perform the method provided in the embodiments of the present application, and have the corresponding functional modules for performing the method and beneficial effects thereof. For technical details not described in detail in this embodiment, refer to the method provided in the embodiments of the present application.

An embodiment of the present application further provides a non-volatile computer-readable storage medium, storing computer-executable instructions, the computer-executable instructions being executed by one or more processors. For example, the method steps in FIG. 2 and FIG. 3 are performed, to implement the functions of the modules in FIG. 4 and FIG. 5.

An embodiment of the present application further provides a computer program product, including a computer program stored in a non-volatile computer-readable storage medium, the computer program including program instructions, the program instructions, when executed by a computer, causing the computer to perform the method for establishing communication between a vehicle diagnosis device and a vehicle in any of the foregoing method embodiments. For example, the method steps in FIG. 2 and FIG. 3 are performed, to implement the functions of the modules in FIG. 4 and FIG. 5.

In the embodiments of the present invention, a method for establishing communication between a vehicle diagnosis device and a vehicle is provided. The method is applied to a vehicle communication interface device. The vehicle communication interface device includes at least two CAN controllers, at least two CAN transceivers and a diagnosis interface. Each CAN transceiver is connected to one CAN controller and one communication pin set of the diagnosis interface. In the method, when the channel establishment instruction of the vehicle diagnosis device is received, each CAN controller in an idle state in the at least two CAN controllers is determined, and then the communication parameter is set for the CAN controller in an idle state. Further, when the specified communication pin set of the vehicle diagnosis device is received, it is determined whether the CAN controller connected to the specified communication pin set is in an idle state. If yes, the communication channel from the vehicle diagnosis device to the specified pin set is established according to the communication parameter in the CAN controller connected to the specified communication pin set, so that the vehicle diagnosis device is communicatively connected to the vehicle through the specified pin set. In the method, no switch is required between the CAN controller and the communication pin set, so that the CAN controller can be easily and quickly allocated.

It should be noted that the described apparatus embodiment is merely exemplary. The units described as separate parts may or may not be physically separate, and parts displayed as units may or may not be physical units, may be located in one position, or may be distributed on multiple network units. Some or all of the modules may be selected based on an actual requirement, to achieve the objectives of the solutions of the embodiments.

Based on the descriptions of the foregoing implementations, a person of ordinary skill in the art may clearly understand that the implementations may be implemented by software in addition to a universal hardware platform, or by hardware. A person of ordinary skill in the art may understand that, all or some of the processes of the method in the foregoing embodiments may be implemented by a computer program instructing relevant hardware. The program may be stored in a computer-readable storage medium. During execution of the program, the processes of the foregoing method embodiments may be included. The storage medium may be a magnetic disk, an optical disc, a read-only memory (ROM) or a random access memory (RAM).

Finally, it should be noted that the foregoing embodiments are merely used for describing the technical solutions of the present invention, but are not intended to limit the present invention. Under the concept of the present invention, the technical features in the foregoing embodiments or different embodiments may be combined, the steps may be implemented in any sequence, and there may be many other changes in different aspects of the present invention. For brevity, those are not provided in detail. Although the present invention is described in detail with reference to the foregoing embodiments, a person of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. A method for establishing communication between a vehicle diagnosis device and a vehicle, applied to a vehicle communication interface (VCI) device, the vehicle communication interface device being configured to connect the vehicle diagnosis device and the vehicle, the vehicle communication interface device comprising at least two controller area network (CAN) controllers, at least two controller area network (CAN) transceivers, at least two switches, and a diagnosis interface, each of the at least two switches disposed between a CAN transceiver and the diagnosis interface, the diagnosis interface comprising at least two communication pin sets, each CAN transceiver being connected to one CAN controller, one switch and one communication pin set, the method comprising:

determining whether either of the two CAN controllers is in an idle state when a channel establishment instruction from the vehicle diagnosis device is received;

setting a communication parameter for each of the CAN controllers determined to be in an idle state;

determining, when a specified communication pin set from the vehicle diagnosis device is received, whether a CAN controller connected to the specified communication pin set is in an idle state;

establishing, if the CAN controller connected to the specified communication pin set is in an idle state, a communication channel from the vehicle diagnosis device to the specified communication pin set according to the communication parameter in the CAN controller connected to the specified communication pin set so that the vehicle diagnosis device is communicatively connected to the vehicle through the specified communication pin set; and determining whether each of the two the CAN controllers is in an occupied state; and
controlling the switch associated with a CAN controller to turn on if the CAN controller is in an occupied state; or
controlling the switch associated with a CAN controller to turn off if the CAN controller is not in an occupied state.

2. The method according to claim 1, wherein before a channel establishment instruction of the vehicle diagnosis device is received, the method further comprises:
determining whether the vehicle diagnosis device has delivered a channel establishment instruction; and
initializing a CAN controller associated with the channel establishment instruction in an idle state if the vehicle diagnosis device has delivered the channel establishment instruction.

3. The method according to claim 1, wherein before a specified communication pin set of the vehicle diagnosis device is received, the method further comprises:
receiving a specifying instruction delivered by the vehicle diagnosis device, the specifying instruction carrying an identifier of the specified communication pin set; and
traversing the communication pin sets in the diagnosis interface according to the identifier to obtain the specified communication pin set matching the identifier.

4. The method according to claim 3, wherein before the step of setting a communication parameter for each of the CAN controllers determined to be in an idle state, the method further comprises:
determining whether the vehicle diagnosis device has delivered the communication parameter of the CAN controller; and
obtaining the communication parameter if the vehicle diagnosis device has delivered the communication parameter of the CAN controller; or
performing the step of receiving a specifying instruction delivered by the vehicle diagnosis device if the vehicle diagnosis device has not delivered the communication parameter of the CAN controller.

5. The method according to claim 1, further comprising:
resetting each remaining CAN controller in an idle state.

6. The method according to claim 1, wherein
the communication parameter comprises a baud rate and/or a filter.

7. An apparatus for establishing communication between a vehicle diagnosis device and a vehicle, applied to a vehicle communication interface (VCI) device, the vehicle communication interface device being configured to connect the vehicle diagnosis device and the vehicle, the vehicle communication interface device comprising at least two controller area network (CAN) controllers, at least two controller area network (CAN) transceivers, at least two switches, and a diagnosis interface, each of the at least two switches disposed between a CAN transceiver and the diagnosis interface, the diagnosis interface comprising at least two communication pin sets, each CAN transceiver being connected to one CAN controller, one switch and one communication pin set, the apparatus comprising:
a first determining module, configured to determine whether either of the two CAN controllers is in an idle state when a channel establishment instruction from the vehicle diagnosis device is received;
a parameter setting module, configured to set a communication parameter for each of the CAN controllers determined to be in an idle state;
a second determining module, configured to determine, when a specified communication pin set from the vehicle diagnosis device is received, whether a CAN controller connected to the specified communication pin set is in an idle state;
a channel establishment module, configured to establish, when the CAN controller connected to the specified communication pin set is in an idle state, a communication channel from the vehicle diagnosis device to the specified communication pin set according to the communication parameter in the CAN controller connected to the specified communication pin set so that the vehicle diagnosis device is communicatively connected to the vehicle through the specified communication pin set;
an adjustment module, configured to adjust the CAN controller on the established communication channel to an occupied state;
a fifth determining module configured to determine whether the CAN controller is in an occupied state; and
a control module configured to control the switch to turn on when it is determined that the CAN controller is in an occupied state;
the control module being further configured to control the switch to turn off when it is determined that the CAN controller is not in an occupied state.

8. The apparatus according to claim 7, further comprising:
a third determining module, configured to determine whether the vehicle diagnosis device has delivered a channel establishment instruction; and
an initialization module, configured to initialize a CAN controller associated with the channel establishment instruction in an idle state when it is determined that the vehicle diagnosis device has delivered the channel establishment instruction.

9. The apparatus according to claim 7, further comprising:
a receiving module, configured to receive a specifying instruction delivered by the vehicle diagnosis device, the specifying instruction carrying an identifier of the specified communication pin set; and
a first obtaining module, configured to traverse the communication pin sets in the diagnosis interface according to the identifier to obtain the specified communication pin set matching the identifier.

10. The apparatus according to claim 9, further comprising:
a fourth determining module, configured to determine whether the vehicle diagnosis device has delivered the communication parameter of the CAN controller; and
a second obtaining module, configured to obtain the communication parameter when it is determined that the vehicle diagnosis device has delivered the communication parameter of the CAN controller;
the receiving module being further configured to receive the specifying instruction delivered by the vehicle diagnosis device when it is determined that the vehicle diagnosis device has not delivered the communication parameter of the CAN controller.

11. The apparatus according to claim 7, further comprising:
a reset module, configured to reset each remaining CAN controller in an idle state.

12. The apparatus according to claim 7, wherein
the communication parameter comprises a baud rate and/or a filter.

13. A vehicle communication interface device, comprising:
- at least one processor; and
- a memory in communication connection with the at least one processor, wherein
- the memory stores instructions executable by the at least one processor, the instructions being executed by the at least one processor, to cause the at least one processor to perform the method according to claim 1.

* * * * *